United States Patent [19]
Albright et al.

[11] Patent Number: 5,237,896
[45] Date of Patent: Aug. 24, 1993

[54] DUST EVACUATION AND TOOL INTERLOCK

[76] Inventors: Russell Albright, 1660 N. Main St., Orange, Calif. 92667; Stephen V. Galerkin, 14455 S. Broadway, Gardena, Calif. 90248

[21] Appl. No.: 874,003

[22] Filed: Apr. 27, 1992

[51] Int. Cl.⁵ .................. B26D 5/00; B27G 19/00
[52] U.S. Cl. .................... 83/61; 51/165.74; 51/273; 83/58; 83/100; 144/252 R; 144/356; 409/137
[58] Field of Search ............. 144/252 R, 252 A; 409/137; 83/58, 61, 100; 51/273, 165.74

[56] References Cited

U.S. PATENT DOCUMENTS

| | | | |
|---|---|---|---|
| 2,862,154 | 11/1958 | Bradley | 83/58 |
| 3,760,538 | 9/1973 | Solhelm | 144/252 R |
| 5,152,327 | 10/1992 | Shoda | 144/252 R |

Primary Examiner—W. Donald Bray
Attorney, Agent, or Firm—Plante, Strauss & Vanderburgh

[57] ABSTRACT

There is disclosed an interlock between a wood working tool and a dust control system in which a standard pressure switch, which can be activated by negative or positive pressure, is located in the dust collector duct which extends to the wood working tool. The switch is electrically connected to the magnetic starter for the wood working tool. The pressure switch responses to a sensed condition of subatmospheric pressure in the dust collector duct to provide power to the woodworking tool, thus insuring that the dust collector system must be functioning to permit operation of the wood working tool. When the dust collector duct becomes blocked or the dust collector fails to function for any reason, the pressure in the duct rises, automatically activating the interlock and interrupting the power supply to the woodworking tool.

8 Claims, 3 Drawing Sheets

DUST EVACUATION AND TOOL INTERLOCK

BACKGROUND OF THE INVENTION

1. Field Of The Invention

This invention relates to a control for the safe operation of a dust removal system and in particular a control a failure in the dust removal system.

2. Brief Statement Of The Prior Art

Adequate dust control in a wood working facility is a salient feature towards the maintenance of the environment as well as compliance towards pollution and safety requirements. The importance of the proper functioning of the dust collector used in the wood working facility is imperative and essential for a safe operation of the entire facility. Dust collectors are commonly provided with evacuation lines which extend to individual tools, such as a saw, shaper, planer, etc. The electrical control for the dust collector is usually independent of that for the woodworking tool, however, in some shops, a remote switch for the dust collector is located adjacent the controls of the woodworking tools for convenient operation. The evacuation lines occasionally clog with sawdust, causing failure in removal of the dust from the woodworking tool, and this condition is often undetected until substantial quantities of sawdust are dispersed into the working environment. Although a safe, economical and efficient configuration is essential for the successful functioning of the woodworking factory, heretofore a completely fail-proof interlock of the dust collector and woodworking tools has not been provided.

OBJECTIVES OF THE INVENTION

It is an objective of this invention to provide an efficient configuration for the safe operation of a wood working factory.

It is another objective of this invention to provide a foolproof interlock of a dust collector and woodworking tools.

It is also an objection of this invention to provide a control system which uses standard components, which are easily available. It is a further objective of this invention to provide an interlock which is free of significant maintenance requirements. It is an additional objective of this invention to provide an interlock between a dust collector and woodworking tools which is efficient, directly responsive to malfunctions in the dust collector system with little or no time lag.

It is a still further objective of the invention to provide an interlock which automatically stops the operation of the wood working machinery safely and accurately upon a failure of the dust collector system.

It is another objective to provide an interlock which is rugged and wear resistant.

BRIEF SUMMARY OF THE INVENTION

This invention is an interlock between a wood working tool and a dust control system in which a standard pressure switch, which can be activated by negative or positive pressure, is located in the dust collector duct which extends to the wood working tool. The switch is electrically connected to the magnetic starter for the wood working tool. The pressure switch responses to a sensed condition of subatmospheric pressure in the dust collector duct to provide power to the woodworking tool, thus insuring that the dust collector system must be functioning to permit operation of the wood working tool. When the dust collector duct becomes blocked or the dust collector fails to function for any reason, the pressure in the duct rises, automatically activating the interlock and interrupting the power supply to the woodworking tool.

BRIEF DESCRIPTION OF THE DRAWINGS

The invention will be described with reference to the figures of which.

DESCRIPTION OF PREFERRED EMBODIMENTS

Figure 1:
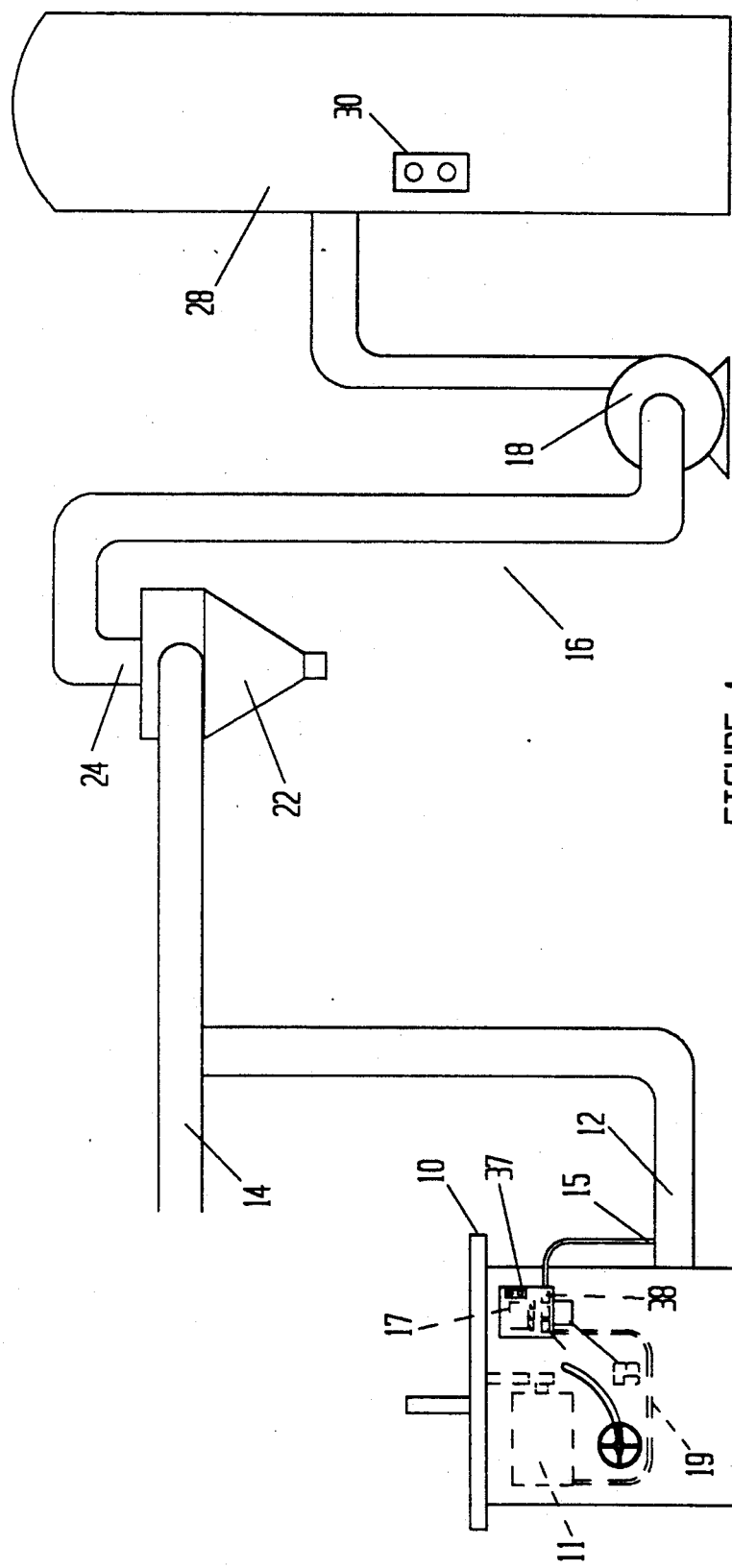
FIG. 1 is an illustration of a typical installation of the invention in a wood working system.

Referring now to FIG. 1, there is shown the various components which are used in the system. Each of the wood working tools, such as the table saw 10 in the factory or shop is provided with a dust collector duct 12 which extends from a main evacuation duct 14. The latter runs to the dust collector 16, which is commonly a high volume air blower 18. While dust collectors of various configurations can be used, the illustrated collector has one or more solids separators 22, usually centrifugal separators with tangential inlets and a center air line 24 that extends to the inlet of the blower 18. One or more dust separators 20 which contain filter bags (not shown) are provided for control of the dust from the air blower 18.

The wood working tool 10 is electrically driven usually with a three phase electrical motor 11 which has a magnetic starter 13 with an on/off manual switch 26. The control ciruits and components are contained in a housing 17 mounted in the tool 10. The air blower 18 of the dust collector 16 is also driven electrically with a manual switch 30. The interlock of this invention comprises a pressure responsive switch 38 which has a pressure tap 15 that is located in the dust collector duct 12 for its respective tool 10 and which is electrically connected with cable 19 in the power supply circuit to the motor 11, which includes the switch 37 for the tool 10.

Figure 2:
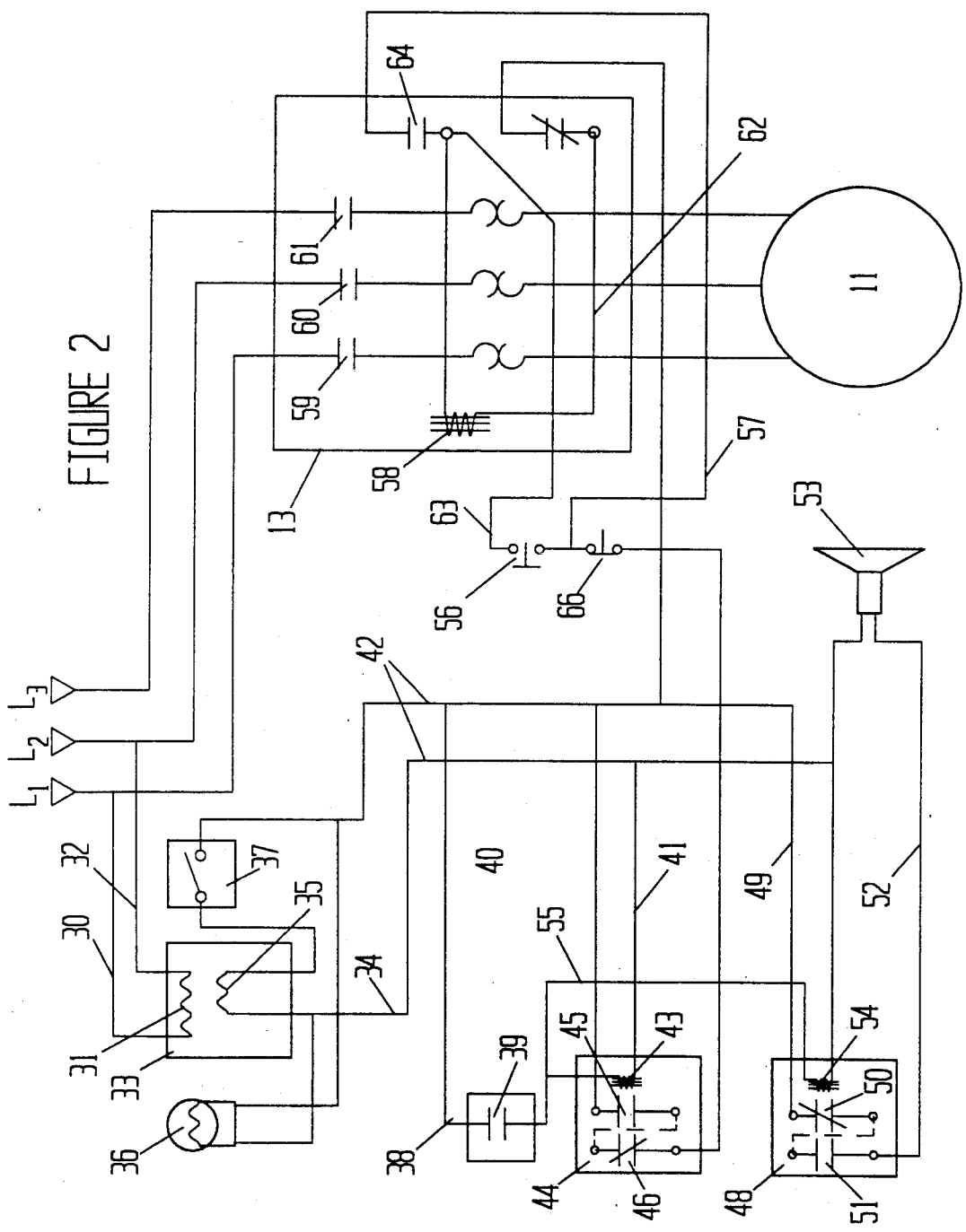
FIG. 2 is an electrical schematic diagram of the invention.

FIG. 2 shows the electrical circuit of the interlock of the invention. The power source 36 comprises a conventional three phase electrical supply with power leads $L_1$, $L_2$ and $L_3$. The power to the control system is taken from power leads $L_1$ and $L_2$ and applied by leads 30 and 32 to the primary windings 31 of a step down transformer 33 to reduce the supply voltage, which can be as high as 480 volts to a lower voltage, e.g., 110–120. Leads 34 and 35 across the secondary provide the power supply bus 42 for the control circuit. A pilot light 36 is connected across the power supply bus to indicate when power is supplied to the control system.

A manual switch 37 is in the lead supply to the pressure responsive switch 38 which has a normally open single pole contact 39. Leads 40 and 41 provide line power from the power supply bus through the pressure responsive switch to the actuator coil 43 of the time delay unit 44. Delay unit 44 has a normally open single pole contact 45 and an integral time delay 46 which is adjustable to provide a time delay upon actuation of a duration from 0 to 30 seconds. The normally open contact 45 is in circuit to the magnetic starter 13 through lead 47.

A second time delay unit 48 with a normally closed single pole contact 50 is connected to the power supply bus 42, and through an integral time delay 51 by to lead 52 lead which extends to an alarm horn 53. The switch in this circuit is normally closed and is held open by actuator coil 54, which receives power through line 55 from the pressure switch 38. The time delay unit 48 has an adjustable time delay duration from 0 to 60 seconds.

The magnetic starter circuit 13 is a conventional 2 to 3 pole AC Magnetic Starter available from various suppliers such as Telemecanique, Inc. The circuit 13 includes a momentary start switch 56, which is normally open. The lead 57 from the normally open switch 56 is connected the relay coil 58 of the magnetic starter 13 by leads 62 and 63. The magnetic field developed in the coil 58 closes normally open contacts 59, 60 and 61 in the power supply leads $L_1$, $L_2$ and $L_3$. When the switch actuator or push button is released, power continues to be supplied to the tool motor, through lead 65 and normally open switch 64, which is also closed by the magnetic field from the coil 58.

The manual control also includes the stop switch 66 which is normally closed and which is used to interrupt the power supply to the coil 58 of the magnetic starter circuit.

In operation, the closing of the manual switch 37 supplies power to the pressure switch 38. When the dust collector 16 is placed in operation, and a subatmospheric pressure is applied to the switch 37, it closes, supplying power to the coils 43 and 54 of the time delay switches, closing contact 45 of delay unit 44 and supplying power to the momentary power switch 56 at the woodworking tool 10. The power supply to the second time delay unit 48 also opens the switch 50 in circuit to the horn alarm 53.

In the event of an interruption of the application of subatmospheric pressure to the pressure switch 38, the latter switch opens. The first time delay 46 retains the contact 45 of time delay unit 44 closed for the preset time interval, usually about 30 seconds. The interruption of power through the pressure switch 38, however, permits immediate closing of the contact 50 of switch, activating the horn 53 and notifying the operator that the woodworking tool will automatically stop operating, giving the operator 30 seconds warning to complete any necessary emergency shut down procedure. After a preset period, usually up to 30 seconds, the time delay interrupts the power supply to the horn, ceasing its operation.

Figure 3:
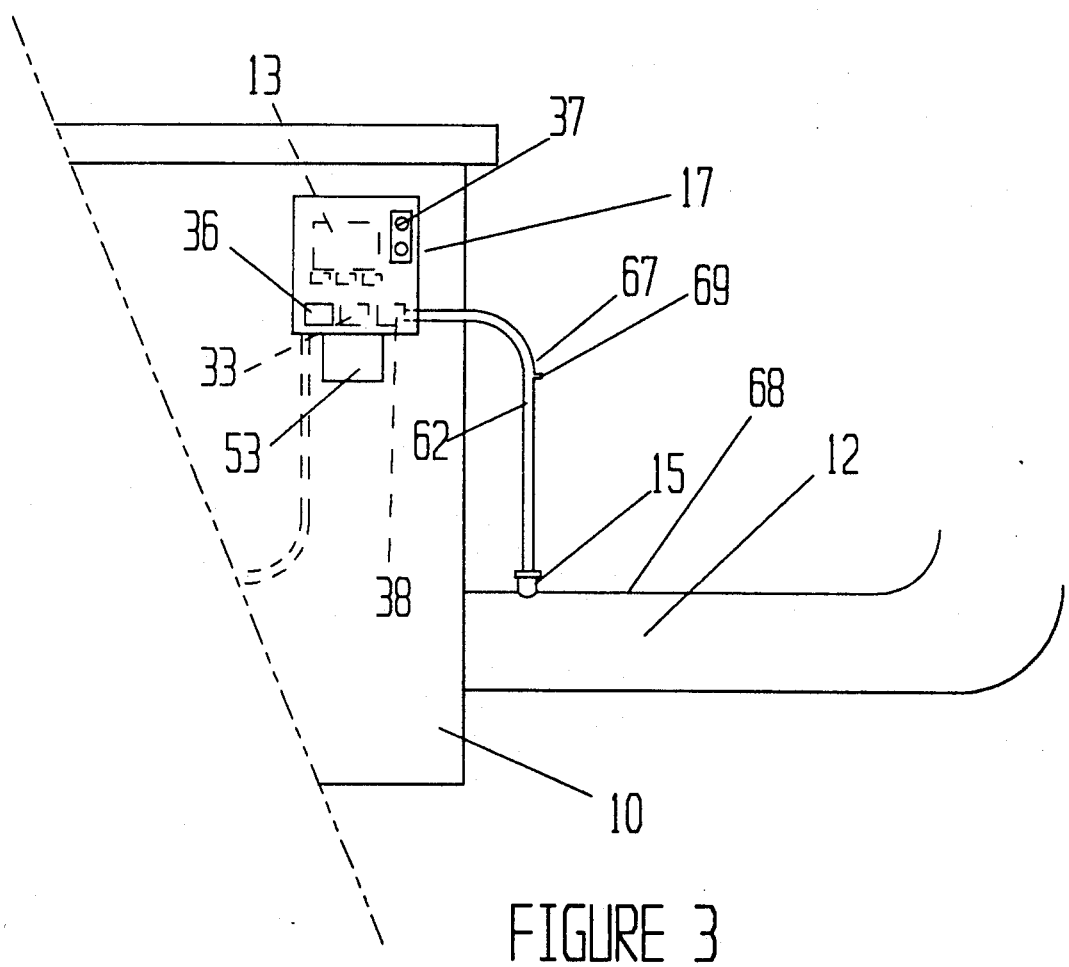
FIG. 3 is an illustration of the pressure switch and its installation.

FIG. 3 shows a preferred installation of the pressure switch 38. The pressure switch 38 can be contained within a control housing 17 which is mounted directly in the tool 10. The pressure sensitive switch 38 is connected by a short conduit 67 which extends to the pressure tap 15 in the evacuation duct 12. Preferably, the tap 15 in the evacuation duct 12 is located in close proximity to the wood working tool 10, so that there is little or no downstream extension of the duct 12 beyond the port 15, thereby eliminating the possibility of the duct clogging between the port and the wood working tool. Preferably the port is on an upper surface 68 of the duct 12 and the conduit 67 is mounted vertically so that dust does not readily collect in the conduit. In a more preferred embodiment, one or more small air vent ports 69 can be provided in the conduit 67 adjacent its upper end 62, i.e., adjacent its connection to the pressure switch 38. This provides an air sweep to maintain the conduit 67 clear of dust and debris, as the subatmospheric pressure within the duct 12 and conduit 67 will induce a small flow of air through the air vent ports 69 and downwardly through the conduit 67, sweeping any dust or debris from the conduit 67 into the duct 12.

The pressure switch 38 is "on" when the evacuation system is running and subatmospheric pressure is applied to the actuator diaphragm of the pressure switch. As soon as the evacuation system stops functioning for any reason, such as electrical failure, or dust blockage in the duct, the pressure at pressure tap 15 rises, and the pressure releases the switch which reverts to its normally off condition, which will disconnect the starter and will automatically stop the machine.

The interlock of this invention insures that the dust control system is operative while the wood working tool is in use. The invention interrupts the operation of any wood working tool if there is a failure in the dust collection system. The invention monitors the functioning of the dust collector accurately and safely. Since the pressure switch is independent of the actual power supply and since it functions mechanically, it does not cause sparking, thus avoiding any potential for an explosion or fire. Hence the complete operation is safe and also efficiently fail safe.

What is claimed is:

1. In a wood working tool having an electrical drive motor with electrical power supply means and an electrical starter switch in electrical circuit thereto and a dust collector system having a dust collector including a dust evacuation duct extending to a dust removal position adjacent said wood working tool and means to apply subatmospheric pressure to said dust evacation duct, the improvement comprising an interlock between said collector system and said wood working tool which includes a port in said evacuation duct adjacent said wood working tool, a normally off pressure responsive means having a pressure inlet port in communication with said port in said evacuation duct and in electrical circuit to said electrical starter switch, whereby the application of subatmospheric pressure from said evacuation duct to said pressure responsive means permits application of electrical power from said electrical power supply means and operation of said drive motor.

2. The interlock of claim 1 wherein said port is located in said evacuation duct in close proximity to said wood working tool.

3. The interlock of claim 1 wherein said port is located on an upper surface of said evacuation duct.

4. The interlock of claim 1 including an extension conduit extending between said port in said evacuation duct and said inlet port of said pressure switch.

5. The interlock of claim 1 wherein said extension conduit is positioned vertically and extends upwardly from said evacuation duct to said pressure switch.

6. The interlock of claim 1 including at least one air port in the upper end of said extension conduit to provide an air sweep through said extension conduit.

7. The interlock of claim 1 including a time delay in circuit between said pressure responsive means and said starter switch of said drive motor.

8. The interlock of claim 1 wherein said pressure responsive means is a pressure responsive electrical switch.

* * * * *